United States Patent [19]
Deboni

[11] Patent Number: 6,155,118
[45] Date of Patent: Dec. 5, 2000

[54] APPARATUS FOR TESTING A DEVICE THAT GENERATES AN AUDIBLE SOUND IN A VEHICLE OCCUPANT COMPARTMENT

[75] Inventor: Albert Deboni, Shelby Township, Mich.

[73] Assignee: TRW Inc., Lyndhurst, Ohio

[21] Appl. No.: 09/084,713

[22] Filed: May 26, 1998

[51] Int. Cl.[7] .................................................. G01H 11/00
[52] U.S. Cl. .......................... 73/649; 340/459; 381/71.2
[58] Field of Search ............................. 73/570, 571, 577, 73/649, 654, 658, 661, 117.1, 117.2, 117.3, 118.1, 431, 865.6, 866.5; 340/425.5, 429, 438, 446, 447, 459, 460, 461, 462; 381/71.2, 88, 203

[56] References Cited

U.S. PATENT DOCUMENTS

| | | | |
|---|---|---|---|
| 3,947,646 | 3/1976 | Saito | 179/146 R |
| 4,058,796 | 11/1977 | Oishi et al. | 340/52 F |
| 4,078,469 | 3/1978 | Calvin | 435/6 |
| 4,426,691 | 1/1984 | Kawasaki | 369/21 |
| 4,449,236 | 5/1984 | Walker, Jr. | 381/91 |
| 4,453,045 | 6/1984 | Bruna | 179/178 |
| 4,620,605 | 11/1986 | Gore et al. | 73/587 |
| 4,949,580 | 8/1990 | Graham et al. | 181/135 |
| 5,005,415 | 4/1991 | Holroyd | 73/646 |
| 5,042,071 | 8/1991 | Stinauer et al. | 84/454 |
| 5,373,555 | 12/1994 | Norris et al. | 379/430 |
| 5,436,612 | 7/1995 | Aduddell | 340/438 |
| 5,579,398 | 11/1996 | Ewens | 381/154 |
| 5,656,428 | 8/1997 | McAllister et al. | 381/158 |

OTHER PUBLICATIONS

The Illustrated Dictionary of Electronics, Sixth Edition, TAB Books—McGraw–Hill, p. 149, 1994.

*Primary Examiner*—Hezron Williams
*Assistant Examiner*—Helen C. Kwok
*Attorney, Agent, or Firm*—Tarolli, Sundheim, Covell, Tummino & Szabo L.L.P.

[57] ABSTRACT

An apparatus includes a sound generating device (30), a housing (12), and a sensor (10). The sound generating device (30) is electrically actuatable to generate a sound for alerting a vehicle occupant to a vehicle condition. The housing (12) is configured to contain and support the sound generating device (30) in a vehicle, and has an acoustic outlet opening (15). The sensor (10) includes a shell (16) containing an acoustically sensitive transducer element (130) responsive to sound waves generated by the sound generating device (30). The shell (16) is formed of a sound absorbing material, and has an annular edge portion (130) defining an acoustic inlet opening (132). A fastener structure (118) mounts the sensor (10) on the housing (12) in a position in which the acoustic inlet opening (132) in the sensor (10) is aligned with the acoustic outlet opening (15) in the housing (12).

8 Claims, 3 Drawing Sheets

APPARATUS FOR TESTING A DEVICE THAT GENERATES AN AUDIBLE SOUND IN A VEHICLE OCCUPANT COMPARTMENT

FIELD OF THE INVENTION

The present invention relates to a device which is electrically actuatable to generate a sound for alerting a vehicle occupant to a vehicle condition, and particularly relates to an apparatus for testing such a sound generating device.

BACKGROUND OF THE INVENTION

A vehicle is typically equipped with at least one device for generating a sound that is audible in the vehicle occupant compartment. The sound is provided as a signal for alerting a vehicle occupant to a vehicle condition such as an open door or an unfastened seat belt.

The sound generating device is contained in a housing which may also contain other electrically actuatable signaling devices. An assembled unit of those parts, including the housing and the devices contained in the housing, must withstand environmental conditions of temperature and humidity when installed in a vehicle. In accordance with this requirement, a production run of assembled units is evaluated by testing a group of sample units. The group of sample units is exposed to specified conditions of temperature and humidity in an environmental simulation chamber. The sample units must also undergo acoustic testing of the sound generating devices contained in the housings. Since each sound generating device must then be distinguished acoustically from the others, the sample units must be acoustically tested individually rather than in a group.

SUMMARY OF THE INVENTION

In accordance with the present invention, an apparatus comprises a sound generating device, a housing, and a sensor. The sound generating device is electrically actuatable to generate a sound for alerting a vehicle occupant to a vehicle condition. The housing is configured to contain and support the sound generating device in a vehicle, and has an acoustic outlet opening.

The sensor comprises a shell containing an acoustically sensitive transducer element responsive to sound waves generated by the sound generating device. The shell is formed of a sound-absorbing material, and has an acoustic inlet opening. A fastener structure mounts the sensor on the housing in a position in which the acoustic inlet opening in the sensor is aligned with the acoustic outlet opening in the housing.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF PREFERRED EMBODIMENTS

Figure 1:
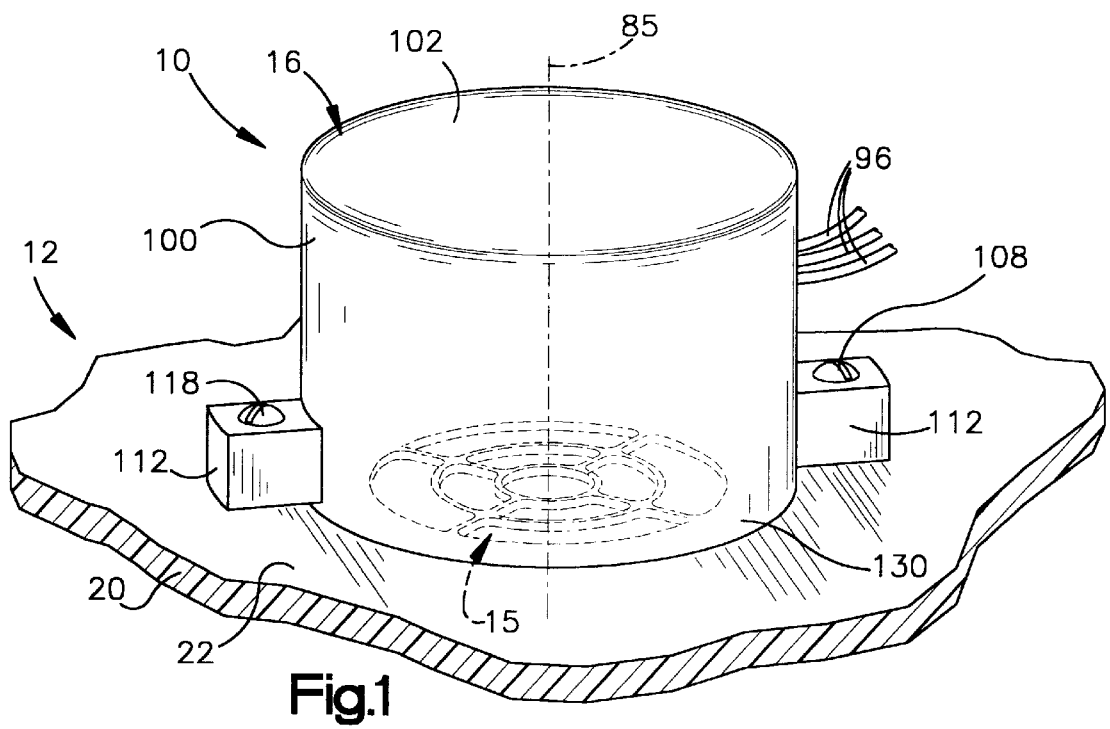
FIG. 1 is a partial isometric view of a first embodiment of the present invention.

A first embodiment of the present invention is shown partially in FIG. 1. The first embodiment includes an electronic sound sensor 10 which is mounted on a housing 12 having an acoustic outlet opening 15. The sensor 10 is received directly over the opening 15 to receive sound waves transmitted outward from the housing 12 through the opening 15. A peripheral outer body portion 16 of the sensor 10 is configured as a cylindrical shell which encloses the electronic parts of the sensor 10. The shell 16 is formed of a sound absorbing material so as to isolate those parts of the sensor 10 from sound waves other than those emanating from the opening 15.

Figure 2:
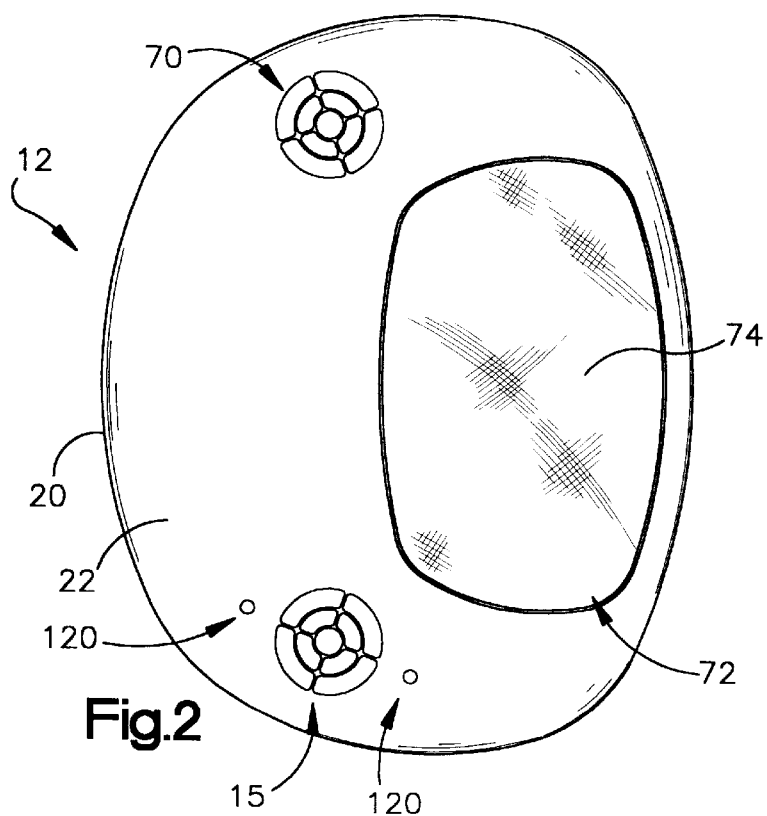
FIG. 2 is a front view of a part of the apparatus of FIG. 1.

As shown more fully in FIG. 2, the housing 12 in the first embodiment of the present invention comprises an interior trim piece for use at an overhead location in a vehicle occupant compartment. The housing 12 has an outer wall 20 with a class A surface 22, i.e., a surface that is visible in the vehicle occupant compartment when the housing 12 is installed in a vehicle. The outer wall 20 has a generally convex contour and a generally oval peripheral configuration in accordance with the trim theme of the particular vehicle in which the housing 12 is to be installed.

Figure 3:
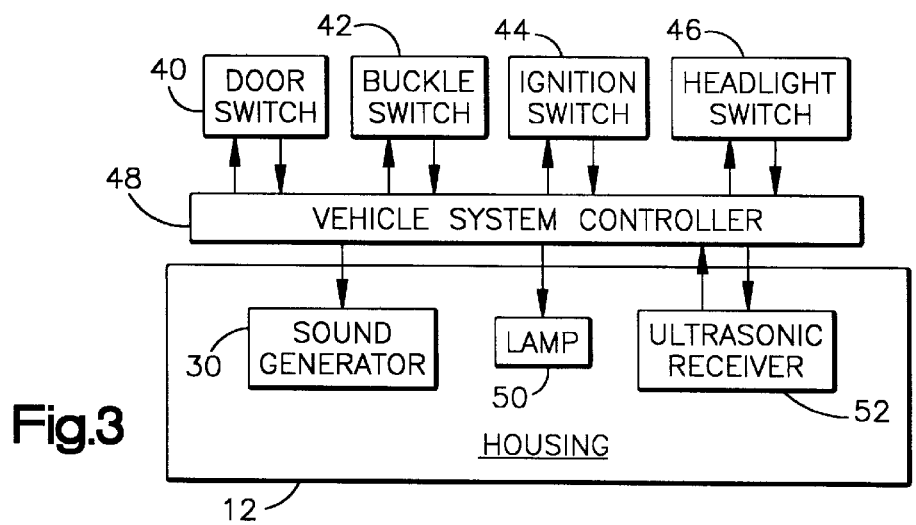
FIG. 3 is a block diagram of parts of the first embodiment.

As shown schematically in FIG. 3, the housing 12 contains a sound generator 30. The sound generator 30 is a known device which is electrically actuatable to generate sound waves having one or more specified frequencies. The sound generator 30 is thus used to generate audible sounds for alerting a vehicle occupant to one or more vehicle conditions. Such vehicle conditions may comprise, for example, an open door, an unfastened seat belt, and/or a headlight or ignition switch that may have been left on inadvertently. Accordingly, when the housing 12 is installed in a vehicle, it is operatively associated with other parts of the apparatus shown in FIG. 3. Such other parts include a door switch 40, a seat belt buckle switch 42, an ignition switch 44 and a headlight switch 46. A vehicle system controller 48 monitors the switches 40–46 in a known manner, and actuates the sound generator 30 accordingly.

The housing 12 further contains a lamp 50 and an ultrasonic receiver 52. The system controller 48 actuates the lamp 50 in a known manner in accordance with the condition of the door switch 40. The ultrasonic receiver 52 operates in a known manner to provide the system controller 48 with a signal indicating the presence and/or position of a vehicle occupant. The vehicle occupant signal may be used by the system controller 48 to control actuation of a vehicle occupant protection device, such as an air bag or a seat belt pretensioner, or to actuate an alarm or other anti-theft device if the sensed occupant is perceived as an intruder.

The acoustic outlet opening 15 in the first embodiment of the present invention is configured as a circular grid. An annular edge 60 (FIG. 4) of the outer wall 20 defines a circular central portion 62 of the opening 15. A plurality of additional edges 64 of the outer wall 20 define a corresponding plurality of additional portions 66 of the opening 15. The additional portions 66 of the opening 15 are shaped as arcuate slots, and are arranged in a pair of concentric arrays extending circumferentially about the central portion 60.

The sound generator 30 is contained in the housing 12 adjacent to the acoustic outlet opening 15. The ultrasonic receiver 52 is contained in the housing 12 adjacent to an acoustic inlet opening 70 which, as shown in FIG. 2, preferably has the same configuration as the acoustic outlet opening 15. The lamp 50 is contained in the housing 12 adjacent to a lamp opening 72, and is concealed by a plastic cover 74 which extends fully across the lamp opening 72.

Figure 5:
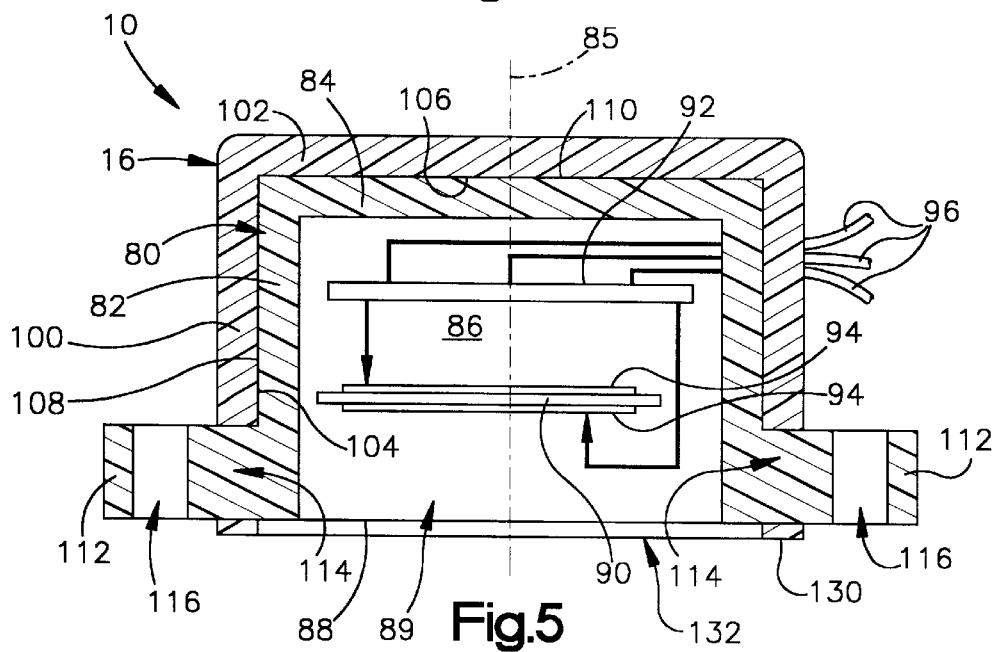
FIG. 5 is a sectional view of a part of the apparatus of FIG. 1, with certain parts being shown schematically.

As shown in greater detail in FIG. 5, the sensor 10 has a rigid inner body portion 80. The inner body portion 80 of the sensor 10 is a cup-shaped structure with a cylindrical side wall 82 and a circular end wall 84 centered on an axis 85. The side wall 82 and the end wall 84 together define an acoustic sensing chamber 86. An open end 88 of the side wall 82 defines an open end 89 of the chamber 86.

Figure 6:
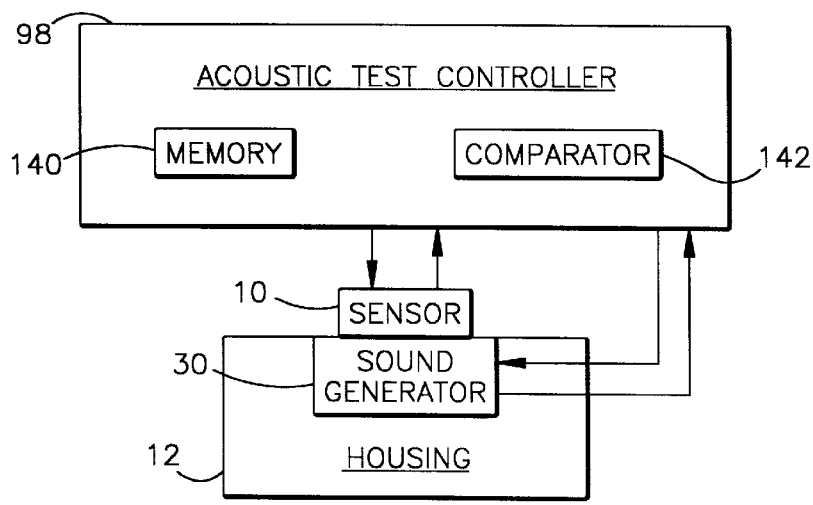
FIG. 6 is a schematic view of other parts of the first embodiment.

As shown schematically in FIG. 5, the electronic parts of the sensor 10 include an acoustically sensitive transducer element 90, a circuit board 92, and a pair of electrodes 94 which are operatively connected between the transducer element 90 and the circuit board 92. The transducer element 90 is preferably formed of piezoelectric material. The circuit board 92 and the electrodes 94 may have any suitable structure known in the art. Those parts 90–94 are located within the chamber 86, and may be mounted on the inner body portion 80 of the sensor 10 by the use of any suitable technique known in the art for mounting such electronic components. A plurality of lead wires 96 are likewise connected to the circuit board 92 in a known manner. The lead wires 96 extend from the sensor 10 for connection with an acoustic test controller 98 (FIG. 6).

Figure 4:
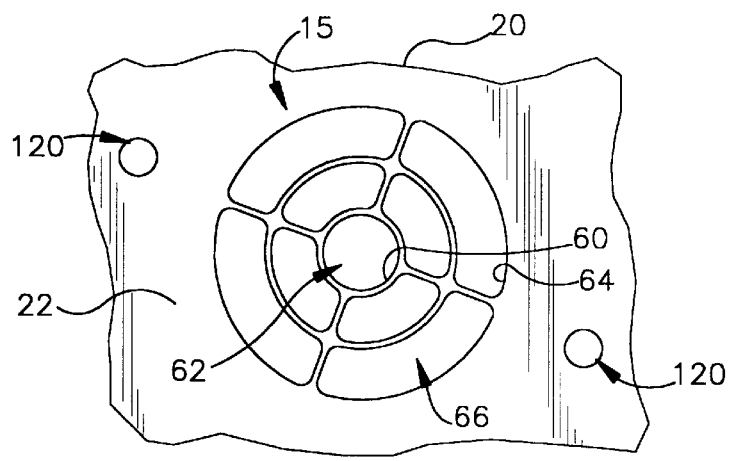
FIG. 4 is an enlarged partial view of the part shown in FIG. 2.

The shell 16 also is a cup-shaped cylindrical structure with a side wall 100 and an end wall 102 centered on the axis 85. A cylindrical inner surface 104 of the side wall 104 and a planar inner surface 106 of the end wall 102 fully overlie corresponding outer surfaces 108 and 110 of the inner body portion 80. A pair of mounting tabs 112 project radially outward from the side wall 82 of the inner body portion 80 through a pair of apertures 114 in the side wall 100 of the shell 16. Each mounting tab 102 has an axially extending bore 116. The bores 116 receive screw-threaded fasteners 118 (FIG. 1) for mounting the sensor 10 on the housing 12. A corresponding pair of apertures 120 for receiving the fasteners 118 are provided in the outer wall 20 of the housing 12, as shown in FIGS. 2 and 4.

In accordance with a particular feature of the present invention, the side wall 100 of the shell 16 defines an annular open end portion 130 of the shell 16. The open end portion 130 of the shell 16 projects a short distance axially beyond the open end 88 of the inner body portion 80, and defines an acoustic inlet opening 132 which is spaced a short distance axially outward from the open end 89 of the chamber 86. The acoustic inlet opening 132 is diametrically larger than the acoustic outlet opening 15. Accordingly, when the sensor 10 is mounted on the housing 12 in the position shown in FIG. 1, the acoustic inlet opening 132 is aligned with the acoustic outlet opening 15, and the open end portion 130 of the shell 16 surrounds the acoustic outlet opening 15. Moreover, when the fasteners 118 are being tightened, they develop an axially directed clamping force which presses the open end portion 130 of the shell 16 firmly against the outer wall 20 of the housing 12. This provides an acoustic seal fully about the periphery of the acoustic inlet opening 132.

When the sensor 10 is mounted on the housing 12 in the foregoing manner, the sensor 10 and the test controller 98 (FIG. 6) are used to test the sound generator 30 in the housing 12. The test controller 98 actuates the sound generator 30 in a specified manner that is expected to generate sound waves of a corresponding specified frequency. The sound waves propagate outward from the housing 12 through the acoustic outlet opening 15 (FIG. 1), and further propagate inward of the sensor 10 through the acoustic inlet opening 132 (FIG. 5) and the open end 89 of the chamber 86. The transducer element 90 responds to the sound waves in the chamber 86 by developing a voltage indicative of the frequency of the sounds waves in the chamber 86. The circuit board 92 then provides the test controller 98 with a sensor output signal that is likewise indicative of the frequency of the sounds waves in chamber 86.

Importantly, the shell 16 acoustically insulates the chamber 86 from the ambient atmosphere. The shell 16 also absorbs vibrations, if any, that are imparted to the sensor 10 by the outer wall 20 of the housing 12. These features of the shell 16 help to ensure that the transducer element 90 in the chamber 86 will respond only to the sound waves that are generated by the sound generator 30. This ensures that the sensor output signal will accurately indicate the frequency of those sound waves. Preferred sound absorbing materials for the shell 16 include elastomeric foams and high density vinyls.

As shown schematically in FIG. 6, the test controller 98 has a memory location 140 storing data representative of a plurality of reference frequencies. These include a reference frequency equal to the specified frequency noted above. The test controller 98 further includes a comparator 144 for comparing the frequency indicated by the sensor output signal with the corresponding reference frequency. The output of the comparator 144 indicates whether or not the sound generator 30 performs in the specified manner.

Figure 7:
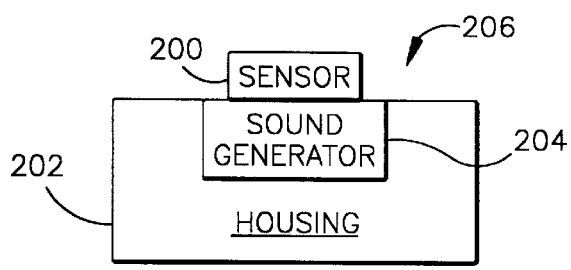
FIGS. 7 and 8 are schematic views of a second embodiment of the present invention.
Figure 8:
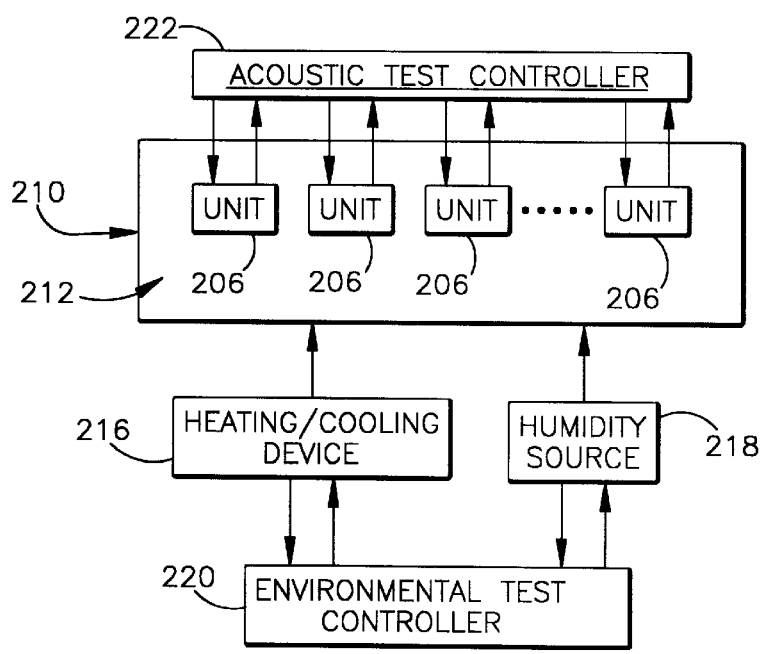

A second embodiment of the present invention is shown schematically in FIGS. 7 and 8. As shown in FIG. 7, the second embodiment includes a sensor 200 which is mounted on a housing 202. The sensor 200 is substantially identical to the sensor 10 described above. The housing 202 is substantially identical to the housing 12 described above, and contains a sound generator 204 like the sound generator 30. The sensor 200 and the housing 202 together define an assembled unit of parts 206 for use in accordance with the present invention.

As shown in FIG. 8, the second embodiment further includes an environmental test apparatus 210 defining an environmental simulation chamber 212. As known in the art, such a test apparatus includes a heating/cooling apparatus 216 and a humidity source apparatus 218 for controlling the temperature and humidity in the chamber 212 under the direction of an environmental test controller 220.

In accordance with the present invention, the assembled unit of parts 206 of FIG. 7 is one of a group of identical units 206. As further shown in FIG. 8, the group of identical units 206 is received in the environmental simulation chamber 212 to undergo specified environmental test loading. Additionally, each unit 206 is operatively associated with an acoustic test controller 222 like the acoustic test controller 98 described above. The sensor shell in each unit 206 isolates the corresponding transducer element from ambient sounds, including the sounds that are generated by the sound generators 204 in the other units 206. The present invention thus enables the units 206 to be acoustically tested as a group rather than individually, and further enables such acoustic testing to be conducted simultaneously with the environmental loading in the chamber 212.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a device which is electrically actuatable to generate a sound for alerting a vehicle occupant to a vehicle condition;
   a housing configured to contain and support said sound generating device in a vehicle, said housing having an acoustic outlet opening;
   a sensor including a shell containing an acoustically sensitive transducer element responsive to sound waves generated by said sound generating device, said shell being formed of a sound absorbing material and having an acoustic inlet opening; and
   a fastener structure which mounts said sensor on said housing in a position in which said acoustic inlet opening of said shell is aligned with said acoustic outlet opening of said housing.

2. Apparatus as defined in claim 1 wherein said shell comprises a peripheral outer body portion of said sensor.

3. Apparatus as defined in claim 1 wherein said shell has an open end portion defining said acoustic inlet opening, said open end portion of said shell adjoining said housing and surrounding said acoustic outlet opening when said shell is in said position.

4. Apparatus as defined in claim 3 wherein said sensor further has a rigid inner body portion contained within said shell, said rigid inner body portion defining an acoustic testing chamber containing said acoustically sensitive transducer element.

5. Apparatus as defined in claim 4 wherein said rigid inner body portion of said sensor is a cup-shaped structure having a cylindrical outer side surface, a circular closed end surface, and an annular open end defining an open end of said acoustic testing chamber, said annular open end being located on an opposite end of said rigid inner body portion than said circular closed end, said shell comprising a cup-shaped structure having inner surfaces fully overlying said outer side surface and said circular closed end surface of said rigid inner body portion, said open end portion of said shell projecting axially beyond said annular open end of said rigid inner body portion.

6. Apparatus as defined in claim 1 wherein said housing has a class A surface.

7. Apparatus as defined in claim 6 wherein said class A surface defines said acoustic outlet opening.

8. Apparatus as defined in claim 1 wherein said housing is one of a plurality of substantially identical housings containing a corresponding plurality of substantially identical sound generating devices, said sensor being one of a plurality of substantially identical sensors mounted on said housings, said apparatus further comprising a test apparatus defining a chamber containing said sensors and said housings, said test apparatus including means for subjecting said sensors and said housings to specified environmental conditions in said chamber and for simultaneously actuating said sound generating devices in said chamber.

* * * * *